June 24, 1924.
R. PAPENDELL
THERMOMETRIC GAUGE
Filed Nov. 15, 1920
1,498,747
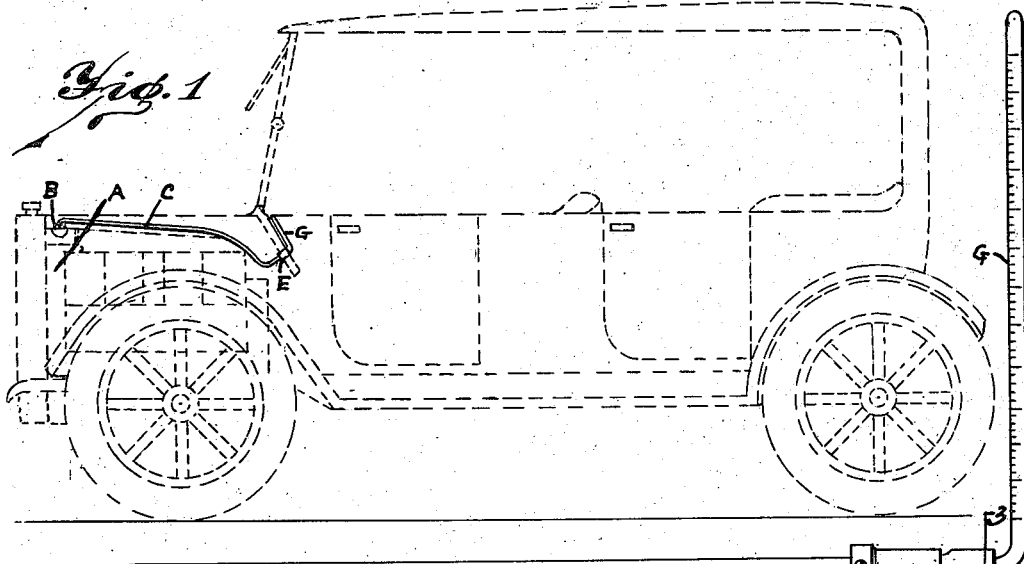
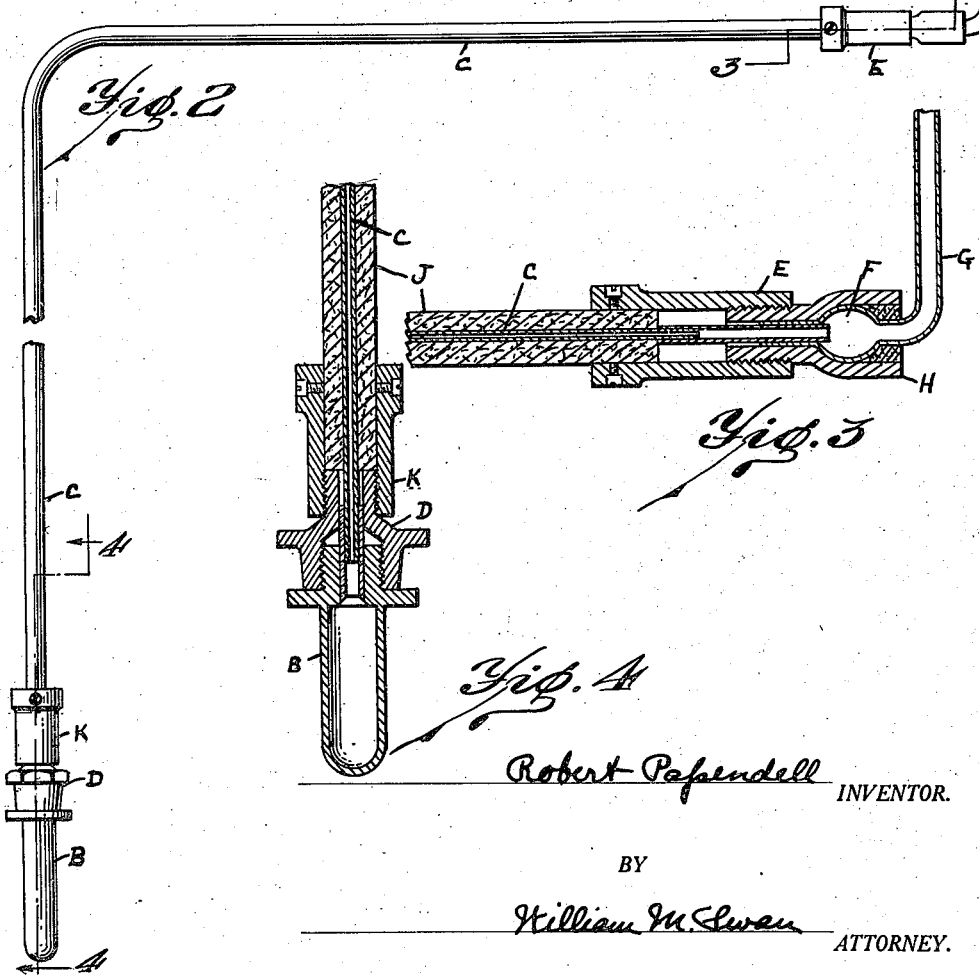
Robert Papendell INVENTOR.
BY
William M. Swan ATTORNEY.

Patented June 24, 1924.

1,498,747

UNITED STATES PATENT OFFICE.

ROBERT PAPENDELL, OF DETROIT, MICHIGAN.

THERMOMETRIC GAUGE.

Application filed November 15, 1920. Serial No. 424,040.

*To all whom it may concern:*

Be it known that I, ROBERT PAPENDELL, a citizen of the United States, residing at Detroit, county of Wayne, State of Michigan, have invented a certain new and useful Improvement in Thermometric Gauges, and declare the following to be a full, clear, and exact description of the same, such as will enable others skilled in the art to which it pertains to make and use the same, reference being had to the accompanying drawings, which form a part of this specification.

This invention relates to thermometric gauges for automobiles, and has for its object an improved device of this type, adapted for connection at one end with the radiator, the temperature of whose water it is desired to observe, while the other end is mounted conveniently near the driver on the dash of the vehicle, thus enabling its easy and accurate reading either by day or night, and by a person whose vision is not sufficiently good to enable him to watch a gauge carried as at present on the radiator cap at the extreme forward edge of the hood. I have found by experience that the use of gauges with pivoted indicator hands or the like for such a purpose, is not to be relied upon for the reading of such temperature changes, and that the cost of employing a relatively cheap article of this type is almost prohibitive as contrasted with the cost of a really fine and carefully made instrument of the kind that I employ.

In the drawings:

Figure 1 is a dotted-in or phantom view of the vehicle, showing in full lines one of my improved devices in place on the dash;

Figure 2 is a large scale broken-off view of one of my improved devices, disassociated from a mounting;

Figure 3 is a sectional view of the tube, on line Fig. 3—3 of Fig. 2; and

Figure 4 is a similar section of the bulb, on line 4—4 of Figure 2.

A indicates the vehicle radiator, into which projects the lower bulb or container B, which is filled with a mercurial fluid, that is, one very delicately responsive to thermal changes; which fluid also fills the flexible tube C, connected therewith by means of the collars D and K and extending beyond the top thereof through the collar E of the shell or frame H into the bulb F of the thermometer tube G, whose upper portion has been exhausted of air before being sealed at the top. It may be indexed or graduated, as desired; and as brought out particularly in Figures 3 and 4, the connection of the tube with the metal shell or frame in which the glass tube is supported is such as to make a firm connection, which does not rely for its strength against pulling out upon direct engagement with the glass tube alone.

This collar E and tube G may be located at a convenient point for reading on the dash of the vehicle, quite close to the driver's seat.

The normal unobjectionable temperature of the radiator water is not such as to heat the mercurial substance in the bulb B to a point sufficient to cause the expansion thereof out of the top of the bulb F sufficiently far to register with some of the markings on the tube G. When, however, the heat of the water rises objectionably, it is immediately indicated by the mercurial liquid in the bulb B, and the top of the column is forced upward accordingly in the tube G, thus giving a warning to the driver. The enlargement or bulb F, located just below the graduated and visibly marked tube G, serves as a sort of reservoir for the mercurial column, so that its expansion or contraction due to variations in temperature may be reflected more evenly in the larger diametered reading tube G than would be the case if the quite small flexible tube C were directly connected therewith.

The fact that the flexible copper tube C may be of any length desired and may be curved as desired, makes the installation of this device on any vehicle a very easy matter, and obviates the objections which have heretofore prevailed due to the presence of the thermometer or gauge on the extreme forward end of the radiator. It is of course obvious that this device may be similarly employed in any use where it is desired or convenient to have the measured and transparent top at a distance from the bottom container bulb, and possibly at a point one or more turns out of line with the bulb.

I have shown at J a protective covering for the relatively small and fragile tube C, which of course may be employed or omitted according to the particular conditions of use of my device, without departure from the spirit of my invention embodied in the other parts,

What I claim is:

1. In combination with an elongated flexible tubing of small diameter, a shell member having an enlarged central chamber with which one end of said tubing is connected and a bulb member connected with the other end of said tubing, thereby providing spaces adjacent a point of intended observation and a relatively remote heat center respectively wherein appreciable volumes of a thermally responsive element which extends through all three of said named parts are available for heat-induced expansion through the smaller-diametered adjacent portions of the structure, collar members for securing the ends of the flexible tube to said bulb member and to said shell member in a way to resist dismembering jarring when in hard use, and a transparent reading tube of smaller diameter than said shell member connected at its lower end therewith, into which the thermally responsive element rises when its lower portion is subjected to the expanding influence of heat.

2. In combination with a bulb member adapted to be placed in a location whose thermal variations are desired to be observed, a flexible tube leading from connection therewith to a relatively remote point the capacity of said tube per unit of length being much inferior to that of said bulb, a transparent indicator tube having an enlarged lower portion connected with the upper end of said tube member though otherwise of lesser diameter than that of said bulb member, thereby affording a storage space for a relatively large quantity of contained thermally responsive fluid whose heat-induced rise, because of its connection with the bulb, is relatively great as regards the relatively attenuated indicator tube, and reinforcing collars for firmly uniting the several parts against jarring dismemberment.

In testimony whereof, I sign this specification in the presence of two witnesses.

ROBERT PAPENDELL.

Witnesses:
WILLIAM M. SWAN,
FREDERIC HEYERMAN.